Figure 1:
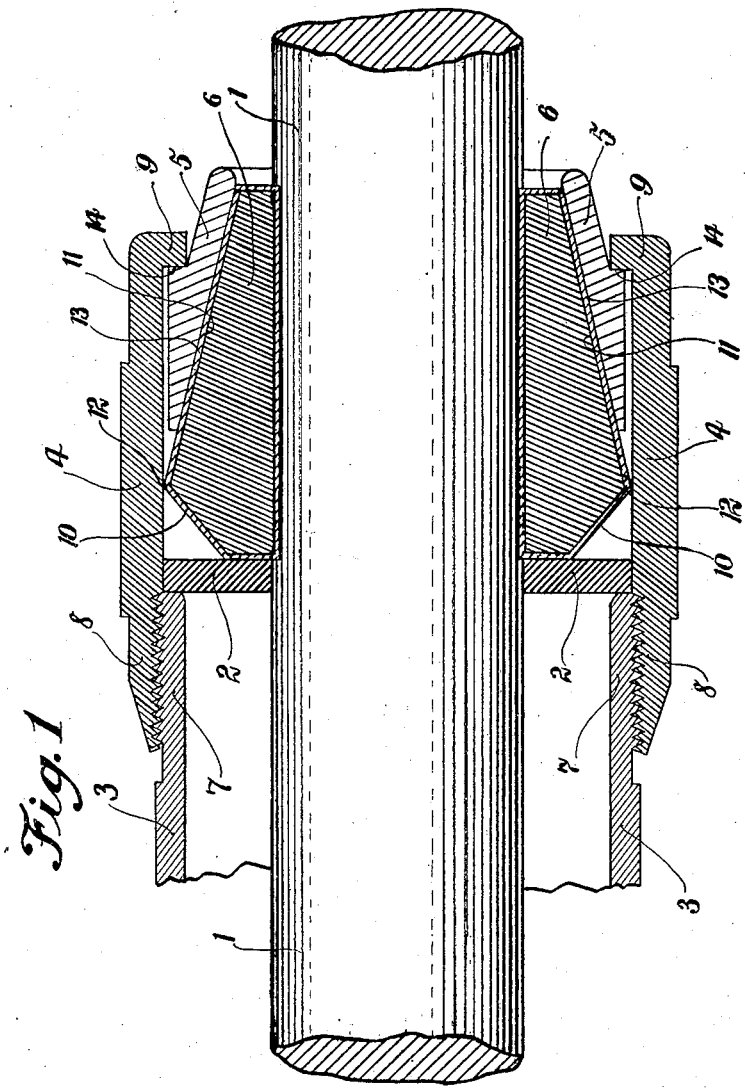

Feb. 13, 1945.　　　L. M. RUSZ　　　2,369,413
CABLE CLAMP
Filed April 2, 1943　　　2 Sheets-Sheet 1

INVENTOR.
LEO M RUSZ
BY
ATTORNEY.

Patented Feb. 13, 1945

2,369,413

UNITED STATES PATENT OFFICE 2,369,413

CABLE CLAMP

Leo M. Rusz, Chicago, Ill., assignor to Oxford-Tartak Radio Corporation, Chicago, Ill.

Application April 2, 1943, Serial No. 481,582

4 Claims. (Cl. 285—22)

This invention relates to clamps for elongated bodies, such as electric cables, hoses, tubes and the like.

Clamps of this type are intended to engage the bodies to which they are applied frictionally, to grip them firmly, to hold them securely in place and to relieve stresses imparted to the soldered connections of the cables and to the joints of the hoses, tubes and the like.

These clamps are usually provided in halves and installed together with connectors, such as connector bodies or boxes; they may be adjusted to fit around varying sizes of the elongated bodies to which they are applied.

In order to obtain a waterproof protection of the soldered connection or of the joints snugly fitting packing or washer receiving sockets are generally provided at the ends of the clamps; collars and sleeves are placed over the clamps and secured on the connector bodies by means of screws.

The known cable clamps have manifold drawbacks.

Their construction and operation is often complicated. In installing the clamps the cable is frequently pinched and the shield, jacket and the internal wiring is ruptured; this necessitates additional protective measures. Other materials than cast steel or cast aluminum cannot be successfully employed in the manufacture of most of the customary cable clamps.

It is the object of the invention to simplify the construction and the operation of the clamps which in the case of the instant invention are a one piece structure and to hereby improve their appearance and economy.

The efficient and successful employment of other materials than metals, such as plastics, ceramics, glass, fibre, Bakelite, rubber and wood for the manufacture of the clamps is another object of this invention.

It is also an object of the invention to provide a cable, tube or hose clamp where no tools are required for installation.

It is another object of the invention to manufacture a cable clamp which requires no additional jacket for protection of the cable against moisture and dirt.

It is an important object of the invention to produce a cable clamp which excludes the danger of pinching or rupturing the cable.

It is an object of the invention to provide a clamp which may be easily adapted to various sizes of the elongated bodies, cables, tubes, hoses and the like, and to the combination of cables.

It is another object of the invention to secure a positive hold on the cable or combination of cables which will prevent stresses from reaching the soldered connections.

It is also an important object of this invention to create an absolutely watertight joint which will stand considerable pressure for, for instance, undersea diving telephone work or undersea cables.

The clamps may be used with equal success for any kind of elongated bodies, whether the same have a cylindrical or an irregular, for instance, hexagonal shape.

Figure 2:
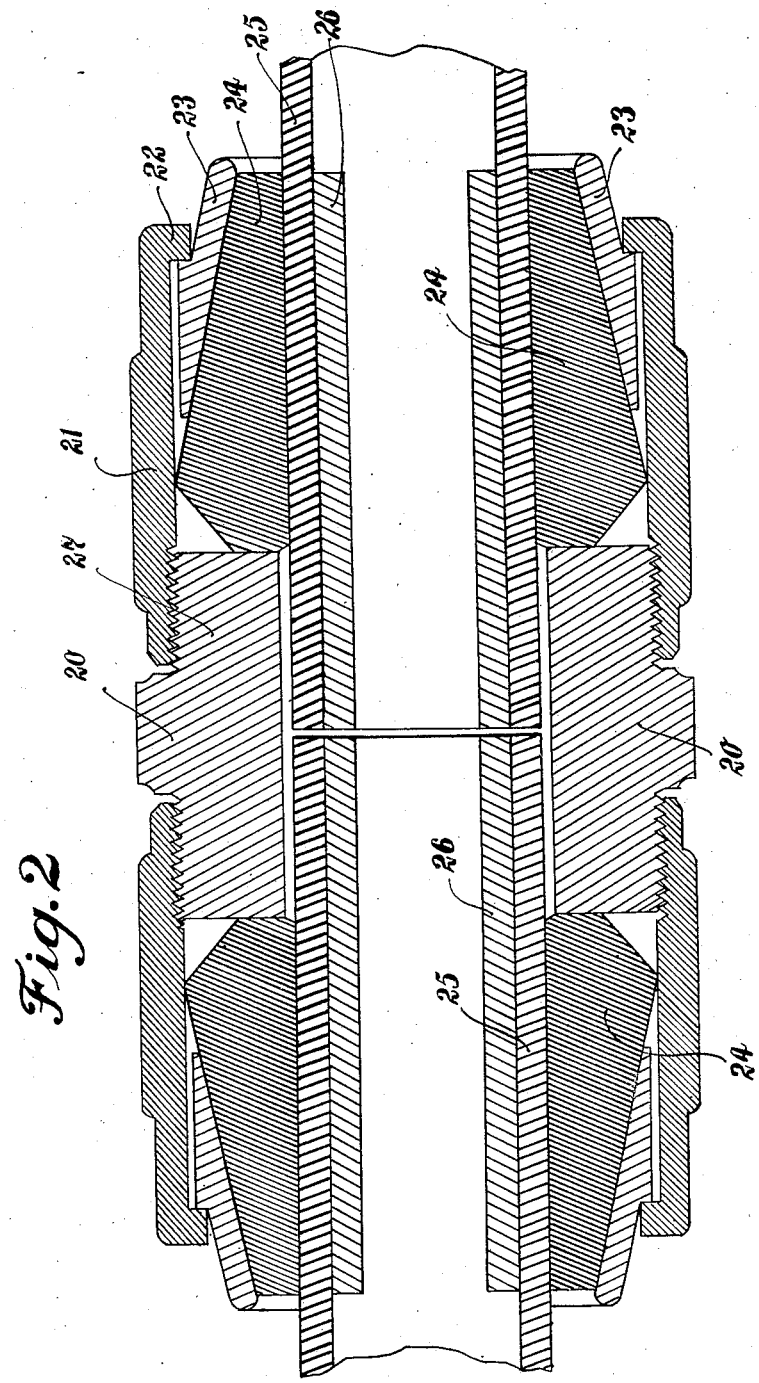

With these and other objects in view which will become more apparent as this specification proceeds, the invention is illustrated by way of example and as a preferred construction in the attached drawings of which Fig. 1 is a vertical sectional elevation through an electric cable showing the installation of my improved clamp, and Fig. 2 is a vertical sectional elevation through a hose coupler.

1 indicates an electric cable. 3 denominates a cable connector body or box of customary construction which is provided with a threaded end 7. An outer collar 4 is provided which is screwed with its inner end 8 onto the threaded end 7 of the connector box 3. This collar is at its outer end provided with an inwardly bent flange 9. Rubber grommet 6 is provided to create the water and dirt proof protection of the cable. This grommet has at its outside or circumference two conical faces 10 and 11 which converge into circular edge 12. A retaining ring 2 is loosely located on the cable between end 7 of the connector box and collar 4.

In order to effectually transmit the pressure from collar 4 to grommet 6 a sleeve 5 is inserted between the collar and the grommet. The sleeve is provided with an inclined inner face 13 which coacts with face 11 of the grommet and has a shoulder 14 against which flange 9 is pressed when the same is screwed onto the connector box.

The operation of the clamp is as follows:

When cable collar 4 is screwed down onto the end of 7 of the connector box 3, incline 13 of sleeve 5 is pushed by flange 9 on incline 11 of rubber grommet 6. Sleeve 5 tightens and compresses hereby the grommet.

A waterproof connection is hereby created; however, the action cannot be carried out to the damage of the cable because the threads on end 7 run up against the retaining ring 2 when cable collar 4 is screwed on as tight as this is possible.

In Fig. 2 a modification is shown of the invention for use as a hose coupler.

25 indicates the hose to be connected. A ring 26 is placed in the hose to take up the pressure when the hose is compressed by the clamp, and to prevent its collapse.

20 denominates the connector or coupler provided with threaded end parts 27.

Parts 21, 22, 23, 24 correspond to parts 4, 3, 5, 6 of the clamp shown in Fig. 1. The operation of the clamp is apparent from the description of Fig. 1.

The hereinbefore described construction admits of considerable modification without departing from the invention; it may be used with equal success for cylindrical or irregularly, for instance hexagonal shaped bodies. Therefore it is the wish not to be limited to the precise arrangements shown and described, which are as aforesaid, by way of illustration merely. In other words, the scope of protection contemplated is to be taken solely from the appended claims, interpreted as broadly as is consistent with the prior art.

I claim:

1. In combination with elongated bodies such as particularly cables, a clamp comprising a connector box, a thread on the end of the said connector box, an outer clamp collar adapted to be secured with its inner end onto the end of the said connector box, said collar being provided with an inwardly bent flange, a grommet of compressible material between the cable and said outer collar and in direct contact therewith, a floating ring on the cable between the said grommet and the said connector box, the arrangement of the said parts being such that by onscrewing the clamp collar onto the said connector box the grommet is compressed upon the cable and against the one side of the said retaining element forming hereby a watertight joint, the connector box simultaneously bearing against the other side of the said retaining element.

2. In combination with elongated bodies, such as electric cables, a clamp comprising a connector box, a thread on the end of the said connector box, an outer collar adapted to be secured with its inner end onto the end of the said connector box, said collar being provided at its outer end with an inwardly bent flange, a grommet of elastic compressible material between the cable and said outer collar and in direct contact therewith, a sleeve between the said grommet and the said outer collar, a floating ring on the cable between the said grommet and the said connector box, the arrangement of the said parts being such that by onscrewing the flange bearing clamp collar onto the connector box the said sleeve is pressed upon the said grommet and the latter is compressed upon the cable and against the one side of the said retaining element, forming hereby a watertight joint, the connector box simultaneously bearing against the other side of the said retaining element.

3. In combination with elongated bodies, such as electric cables a clamp comprising a connector box, a thread on the end of the said connector box, an outer collar adapted to be secured with its inner end onto the end of the said connector box, said collar being provided at its outer end with an inwardly bent flange, a grommet of elastic compressible material between the said cable and outer collar and in direct contact therewith, the said grommet being double-conically shaped at its outside, the two conical faces converging towards a collar contacting edge, a sleeve between the said grommet and the said clamp collar having an inner inclined face to contact with the outer conical face of the grommet, a floating ring on the cable between the said grommet and the said connector box, the arrangement of the said parts being such that by onscrewing the clamp collar onto the connector box the sleeve is pressed upon the said grommet and the latter is compressed upon the cable and against the one side of the said retaining ring, forming hereby a watertight joint, the connector box simultaneously bearing against the other side of the said ring.

4. In combination with elongated bodies, such as tubes, hoses, a clamp comprising a connector, a thread on the end of the said connector, an outer collar adapted to be secured with its inner end onto the end of the said connector, said collar being provided at its outer end with an inwardly bent flange, a grommet of elastic compressible material between the said cable and outer collar and in direct contact therewith, the said grommet being double-conically shaped at its outside, the two conical faces converging towards a collar contacting edge, a sleeve between the said grommet and the said clamp collar having an inner inclined face to contact with the outer conical face of the grommet, a floating ring on the cable between the said grommet and the said connector box, the arrangement of the said parts being such that by onscrewing the clamp collar onto the connector the said sleeve is pressed upon the said grommet and the latter is compressed upon the cable and against the one side of the said connector, hereby forming a watertight joint.

LEO M. RUSZ.